US011783012B1

(12) United States Patent
Ogram

(10) Patent No.: US 11,783,012 B1
(45) Date of Patent: Oct. 10, 2023

(54) FINGERPRINTED SOFTWARE

(71) Applicant: Mark Ogram, Tucson, AZ (US)

(72) Inventor: Mark Ogram, Tucson, AZ (US)

( * ) Notice: Subject to any disclaimer, the term of this patent is extended or adjusted under 35 U.S.C. 154(b) by 0 days.

(21) Appl. No.: 17/803,824

(22) Filed: Dec. 9, 2022

(51) Int. Cl.
*G06F 21/00* (2013.01)
*H04L 29/06* (2006.01)
*G06F 21/12* (2013.01)
*G06F 21/71* (2013.01)
*H04L 9/08* (2006.01)

(52) U.S. Cl.
CPC ............ *G06F 21/125* (2013.01); *G06F 21/71* (2013.01); *H04L 9/0866* (2013.01)

(58) Field of Classification Search
None
See application file for complete search history.

(56) References Cited

U.S. PATENT DOCUMENTS

| | | | | |
|---|---|---|---|---|
| 7,861,226 B1* | 12/2010 | Episkopos | .......... | G06F 11/3676 717/124 |
| 11,510,019 B2 | 11/2022 | Barrows | | |
| 11,513,815 B1 | 11/2022 | Blankstein | | |
| 11,513,818 B1 | 11/2022 | Chen et al. | | |
| 11,516,196 B1 | 11/2022 | Barrows | | |
| 2014/0122704 A1* | 5/2014 | Wang | ..................... | H04L 49/354 709/224 |
| 2016/0028921 A1* | 1/2016 | Thrasher | ............ | H04N 1/40012 358/519 |
| 2017/0180239 A1* | 6/2017 | Hittel | .................. | H04L 63/0428 |
| 2019/0378192 A1* | 12/2019 | Fox | ...................... | G06F 16/5866 |
| 2020/0348419 A1* | 11/2020 | Rahman | .................. | G01S 19/09 |
| 2020/0394399 A1* | 12/2020 | Gilbert | ................... | G06V 10/56 |
| 2021/0090066 A1* | 3/2021 | Beye | ...................... | G06Q 20/02 |
| 2021/0165855 A1* | 6/2021 | Stuehler | ............ | G06F 16/90344 |

* cited by examiner

*Primary Examiner* — Lisa C Lewis
(74) *Attorney, Agent, or Firm* — Mark Ogram

(57) ABSTRACT

The invention involves a computer or system of computers such as workstations used to provide human-readable code along with a tag associate therewith, said tag containing identifying data to an operating computer. Using a database of authorized computers (workstations), the operating computer receives the line(s) of human-readable code from the workstation and converts it into machine readable code, if and only if, the source of the code is authorized based on the database of authorized computers.

11 Claims, 3 Drawing Sheets

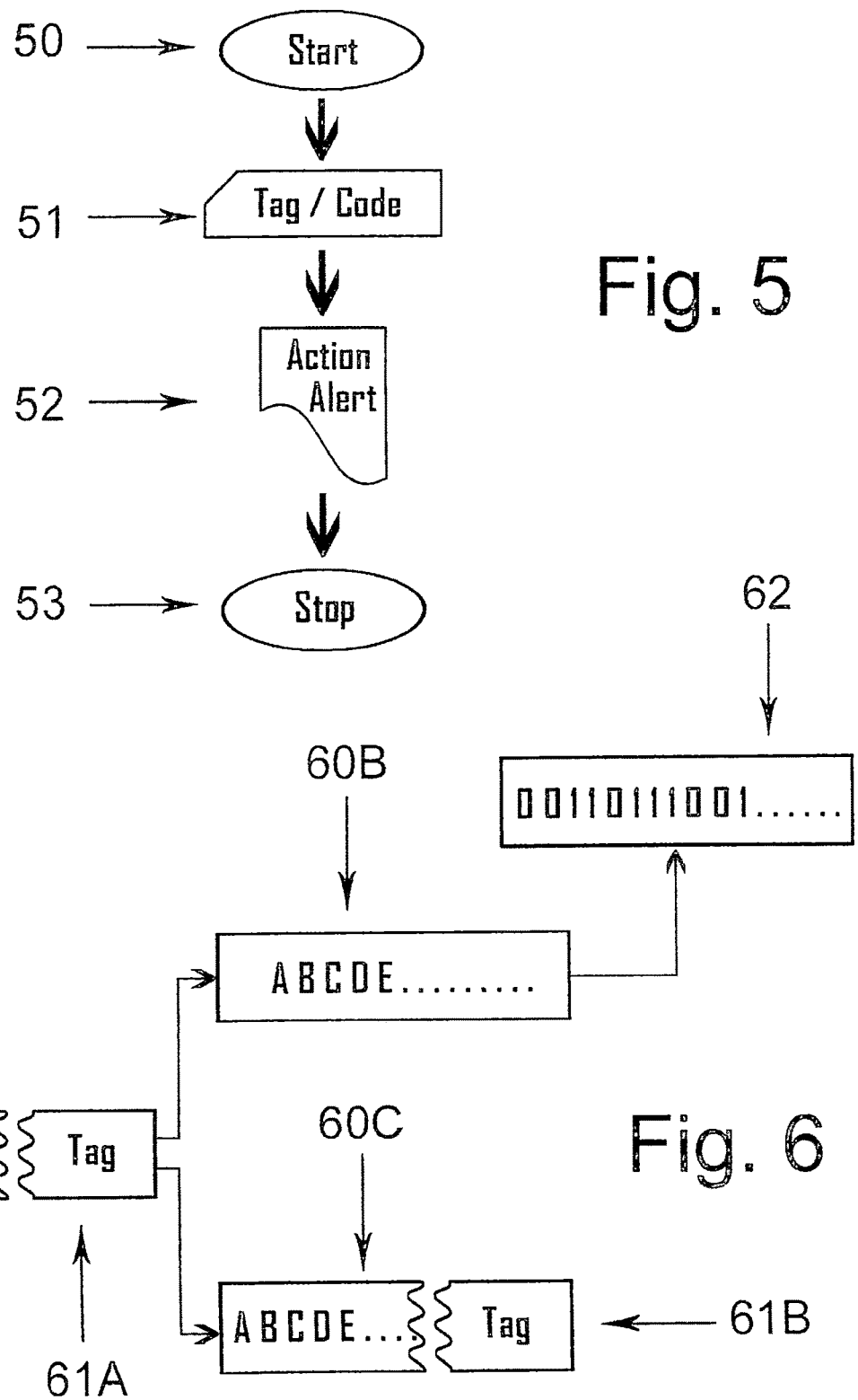

FINGERPRINTED SOFTWARE

BACKGROUND OF THE INVENTION

This invention relates generally to software coding and more particularly to identifying a source of the software code.

Software is generally considered in two different categories: human-readable and machine-readable. Its development by the programmer is in human-readable form (such as C++, Fortran, Basic. Cobol, HTML, etc.) which is understandable by a human. This human-readable code (in alphanumerics) is then converted into machine-readable (a series of ones and zeros) which set the transistors/switches within the operating computer so that the operation defined by the human-readable code is realized.

The human-readable codes for commercial software extend to millions of commands and are extremely complex. The programmers can only focus on a small portion of the code. Typically, the programmer works at a work-station remote from the actual operating computer and inserts their code into the overall program once it has been developed and "de-bugged".

The problems arise when a forensic type of audit of the program must be made to find code which is no longer needed, has a purpose no longer desired, or has a nefarious purpose by being placed into the program to disrupt or destabilize the program. The nefarious code is inserted into the program by either a hacker or even by employees who have their own agenda.

These problems are all too evident when the code of social media, operating systems for spreadsheets and banking institutions, and others, are acquired or need to be "cleaned up" so that the new laws and/or objectives are accomplished.

Finding these small segments of code within a program with millions of lines becomes physically impossible and as such, the task is done, at best, in a cursory manner.

It is clear there is a significant need for a tracking system on programs/software.

SUMMARY OF THE INVENTION

The invention involves a computer or system of computers such as workstations used to provide human-readable code to another computer, such as an operating computer. Using a database of authorized computers (workstations), the operating computer receives the line of human-readable code with any associated tag conveying identification therein. This human-readable code from the workstation is converted into machine-readable code, if and only if, the source of the human-readable code is authorized are verified by the based on the database of authorized computers.

Within this discussion, the terms "computer", "human-readable" code, "machine-readable" code, and "database" are used. Those of ordinary skill in the art readily recognize these terms and the various forms they may take, including, but not limited to, those described in: U.S. Pat. No. 11,513,818, entitled "Method, Product, and System for Integrating a Hardware Accelerator with an Extensible Processor" issued Nov. 29, 2022, to Chen et al.; U.S. Pat. No. 11,514,019, entitled "Systems and Methods for Maintaining and Updating an Even Logging Database" issued to Magen et al. on Nov. 29, 2022; U.S. Pat. No. 11,516,196, entitled "System and Methods for Authenticating Entities" issued to Barrows et al. on Nov. 29, 2022; and U.S. Pat. No. 11,513,815, entitled "Defining Data Storage Within Smart Contracts" issued to Blankstein et al. on Nov. 29, 2022; all of which are incorporated hereinto by reference.

Further, as used herein, the term "workstation" refers to a computer which is used by a programmer/operator 18 to generate the human-readable code. Typically, another computer is used to convert this human-readable code into machine-readable code which is optionally used to operate the machine-readable code to accomplish an internal task or a task for remote "users" of the operating system.

The invention, as a system of computers, has a first computer typically labeled the workstation, and a second computer being the operational computer which runs the machine-language code from an operator. The first computer is used to accept, the human-readable code. To this human-readable code is added a tag (ideally invisible to the operator of the workstation/first computer), of data including the non-volatile serial number of the workstation.

The tag contains a variety of data indicies which are used to identify the workstation, the operator, and ideally the time of creation of the human-readable code. The workstation identification within the tag is collected from the non-volatile identification of the workstation from a variety of sources, including, but not limited to the non-volatile identification such as the serial number of the Central Processing Unit of the workstation/first computer. The operator identification is obtained from the operator/programmer and is often the individual's employment number or such. This combination of workstation ID and operator ID is useful to make sure that only authorized workstations have access (to eliminate hackers) and that the proper operator is using the workstation. In the case of two or more operators using the same workstation at different periods of the day, the time of day that the human-readable code was generated allows for a cross check as outlined above.

The tag is associated with the human-readable code in a variety of ways. The tag, in one embodiment, is attached to the front or back of a single line of human-readable code, or, if a series of human-readable codes are to be loaded at once, the tag is placed at the front of the series and at the back of the series to "mark" the source of the human-readable code series.

The human-readable code with tag is communicated to the second computer, often referred to as the operating computer. This second computer looks to the tag to determine if the source of the human-readable code is acceptable (as example, the tag contains an authorized computer identification and operator identification). If the incoming human-readable codes is acceptable based on a review of the tag, the human-readable code with tag is inserted in the existing human-readable code constituting the operating system and the entirety is converted into machine-readable code which the second/operating computer utilizes.

Note, the tag is configured so that it is not converted during the conversion into machine-readable code.

If, on the other hand, the tag is not acceptable (wrong computer or wrong programmer), the human-readable code and tag is passed onto a third or monitoring computer to flag it as being an attempt to hack or place nefarious programming into the operating system. Note that the inappropriate code is silently avoided without notifying the source of the inappropriate code.

If at a later date (after the operating system has been established), there is a need to find code from a specific computer or individual (often suspected of planting a virus or causing the operating system to behave inappropriately), the human-readable code is easily scanned for the tag associated with the specific computer or individual and corrective action can be taken.

In the operation outlined above, the authorized computers and the authorized programmers/users are identified on databases used by the second computer in accepting/rejecting the submitted human-readable code.

In some embodiments of the invention, a database also keeps a record of when the authorized programmer is working. In this embodiment, the tag also contains a time stamp on when the human-readable code was submitted and the database of time of employment is used to also accept/reject the human-readable code before conversion to the machine-readable code. This embodiment prevents an interloper from getting another employee's identification and using the employee's workstation/computer to create unauthorized alterations to the operating system.

The invention, together with various embodiments thereof will be fully explained by the accompanying drawings and the following description.

DRAWINGS IN BRIEF

FIG. 5 is a flowchart of the operation of the quality control or monitoring computer.

FIG. 6 graphically illustrates the data being transferred in an embodiment of the invention.

DRAWINGS IN DETAIL

Figure 1:
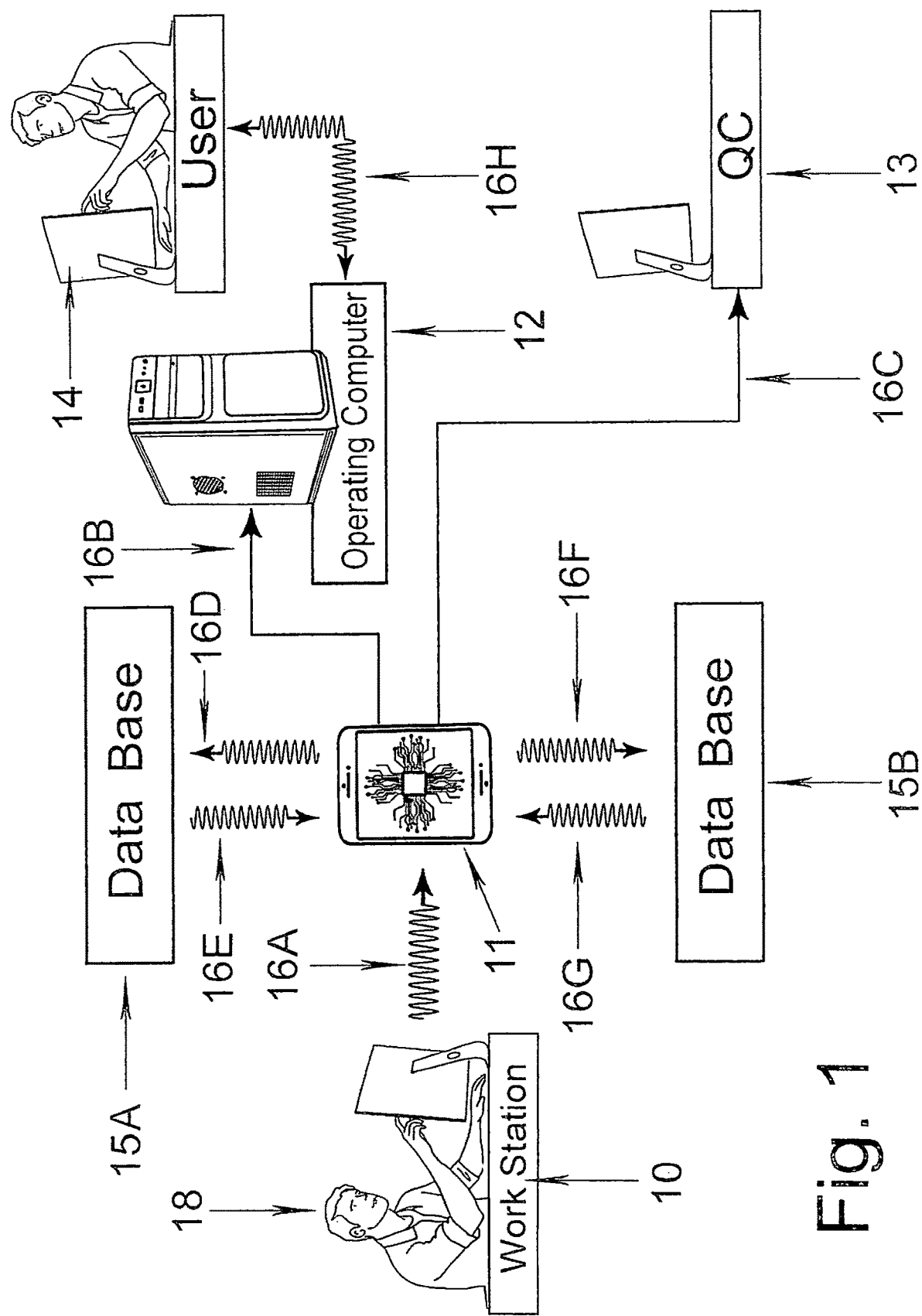
FIG. 1 is block diagram of the preferred system of computers for this invention.

FIG. 1 is block diagram of the preferred system of computers for this invention.

Computer/work station 10 is used by the programmer 18 to create the huma-readable code. Work Station 10 receives the human-readable code from the programmer 18 and combines it with the tag (data group) containing the data identifying Computer/work station 10 and the programmer 18 (typically the employee identification) and communicates 16A this combination (human-readable code with tag) to computer 11.

As noted earlier, the tag is associated with the human-readable code by being attached to the front, the back, or on both sides of a series of human-readable codes.

Computer 11 checks the data from the tag identifying the work station 10 with database 15A and the programmer's identification from the tag with database 15B. Based upon the result from database 15A and database 15B (if both are acceptable, workstation and programmer), computer 11 converts the human-readable code to machine-readable code and communicates 16B the machine-readable code to the operating computer 12 from which a user 14 is able to interact 16H.

Although this embodiment shows different mechanisms (computer 11, database 15A, database 15B, and operating computer 12), those of ordinary skill in the art readily recognize that any combination of these mechanisms may be combined into a single mechanism to still obtain the result outlined herein.

If the check with database 15A or database 15B shows a problem within the tag, then the tag along with the human-readable code is communicated to a monitoring computer 13 which performs quality control allowing an operator thereof to review and take whatever action deemed appropriate.

Note, ideally, there is minimal feedback to operator 18 of work station 10. Ideally there is n notice whatsoever that there has been a problem with the submitted human-readable code and that it has not been installed into the operating system. A hacker in this situation is ignorant that their attempt to implant or alter the operating system has failed.

In one embodiment, if the monitoring personnel wants to find the code associated with a particular programmer, then via the QC/Monitoring computer, a request with computer 11 yields all human-readable code associated with that programmer through a review of the tags.

Figure 2:
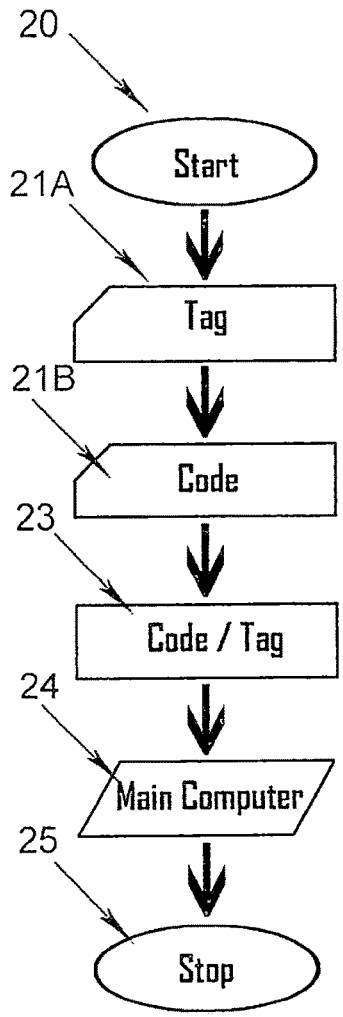
FIG. 2 is a flowchart of the operation of the work station on which the programmer/user generates the human-readable code.

FIG. 2 is a flowchart of the operation of the work station (such as workstation 10 of FIG. 1) on which the programmer/user 18 generates the human-readable code.

Once the program starts 20, the tag information is obtained 21A typically being the serial number of the workstation as well as the programmer's identification. In some embodiments, the tag also includes the time/date that the workstation is being used.

The programmer enters the human-readable code 21B which is attached to the tag 23. The combination of human-readable code and tag is communicated 24 to the main computer (reference 11 in FIG. 1).

Figure 3:
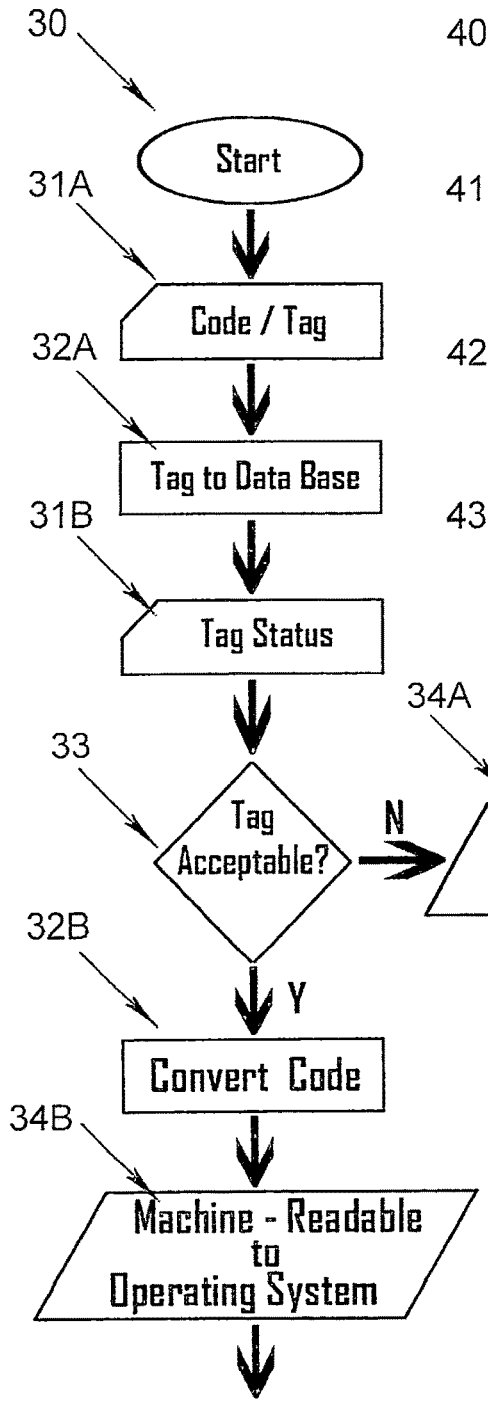
FIG. 3 is a flowchart of the operation of the computer used to selectively convert the human-readable code into machine-readable code.

FIG. 3 is a flowchart of the operation of the computer (reference number 11 of FIG. 1) used to selectively convert the human-readable code into machine-readable code.

After start 30, the program receives the human-readable code and tag 31A (reference 24 from FIG. 2). Using the information within the tag, the data therein is sent 32A to the appropriate databases for check on validity of the source of the human-readable code. This validity check 31B is received and a determination 33 is made on whether the source of the human-readable code is acceptable or not.

If not acceptable, the tag and human-readable code is sent 34A to the quality control computer (reference 13 of FIG. 1) and the process stops 35.

If the tag information is acceptable, the human-readable code is converted to machine-readable code 32B which is communicated to the operating computer (reference 12 of FIG. 1) to be used as its operating system. The program then stops 35.

Figure 4:
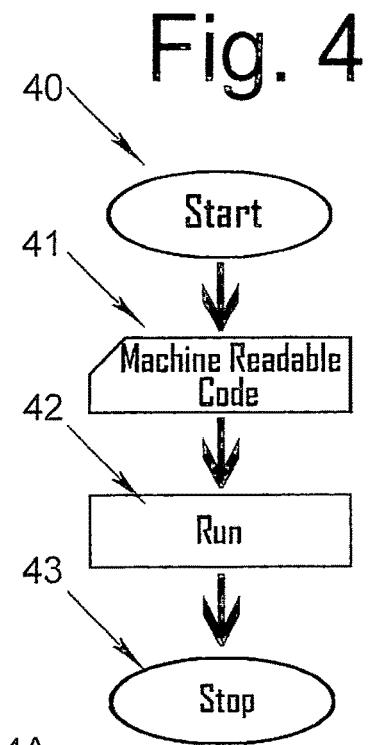
FIG. 4 is a flowchart of the operation of the operating computer which runs the machine-readable code.

FIG. 4 is a flowchart of the operation of the operating computer (reference 12 of FIG. 1) which runs the machine-readable code.

The program starts 40 and receives 41 the machine-readable code (reference 34B of FIG. 3) which it then runs 42 and stops 43.

FIG. 5 is a flowchart of the operation of the quality control or monitoring computer first described as reference 13 in FIG. 1.

The program starts 50 and receives 51 the human-readable code and tag (from reference 34A of FIG. 3) and gives an alert 52 for the quality control operator to take whatever action is appropriate. The program then stops 53

FIG. 6 graphically illustrates the data being transferred in an embodiment of the invention.

In the communication 16A, the transmission includes the human-readable code 60A which has tag 61 associated thereto. Although this illustration places the tag 61A at the end of human-readable code 60A, other embodiments have the tag at the beginning of human-readable code 60A; and, still others place the tag at the start and the end of the human-readable code 60A.

Ideally, tag 60A is not visible to operator 18.

The communication 16B contains only the human-readable code 60B as this communication has verified, via tag 61A, that the source of the human-readable code 60B has been verified. The human-readable code 60B is converted into machine-readable code 62.

If tag 61A does not indicate a valid source of the code 60A, the human-readable code 60C and tag 61B is communicated to quality control, 16C.

It is clear that this invention provides for a highly improved tracking system for programs/software.

What is claimed is:

1. A system of computers comprising:
   a) a first computer comprising a processor and memory, wherein the first computer is configured to receive at least one line of human-readable code from an operator and attach a non-functional tag of data to the at least one line of human-readable code, and the first computer receives an operator identification included with the non-functional tag; and,
   b) a second computer comprising a processor and memory, wherein the second computer is configured to insert the non-functional tag of data into the at least one line of human-readable code; and,
   c) a database of authorized users; and wherein the second computer utilizes data from the database of authorized users in conjunction with the non-functional tag of data to selectively convert the at least one line of human-readable code into machine-language; and,
   d) a database of authorized computers identified by their serial numbers; and wherein the second computer is configured to utilize data from the database of authorized computers in conjunction with the non-functional tag of data for selection of the at least one line of human-readable code to be converted into machine-language.

2. The system of computers according to claim 1, wherein: the first computer contains a serial number identifying the first computer; and, the non-functional tag of data includes the serial number.

3. The system of computers according to claim 1, wherein: the first computer is configured to utilize an operator identification; and, wherein the non-functional tag of data includes an operator generated identification.

4. The system of computers according to claim 1, wherein the first computer generates a time and date indicia indicative of a current time and date of the human-readable code and wherein the non-functional tag of data includes the time and date indicia.

5. The system of computers according to claim 4, wherein the second computer has access to a time database indicative of work times for the operator.

6. The system of computers according to claim 5, wherein the second computer is configured to utilize data from the time database in conjunction with the non-functional tag of data to selectively convert the at least one line of human-readable code into machine language.

7. The system of computers according to claim 1,
   a) further including a monitoring computer; and,
   b) wherein the second computer is configured to communicate the at least one line of human-readable code and non-functional tag of data to the monitoring computer.

8. A system of computers comprising:
   a) a first computer comprising a processor and memory, wherein the first computer is identified by an indicia of a serial number identifying the first computer and configured to receive a line of human-readable code from an operator, said first computer configured to associate a non-functional tag of data to the line of human-readable code containing the indicia on the serial number; and,
   b) a second computer comprising a processor and memory, and a database of authorized computers, wherein said second computer is configured to,
      1) convert the line of human-readable code into machine-language if the indicia is within the non-functional tag of data within the database of authorized computers, and,
      2) communicate the line of human-readable code and non-functional tag of data to a monitoring computer if the indicia within the non-functional tag of data is not within the database of authorized computers.

9. The system of computers according to claim 8, wherein the first computer is configured so that the non-functional tag of data is not communicated to the operator.

10. The system of computers according to claim 9, wherein the non-functional tag of data includes an operator identification unique to the operator.

11. A computer comprising a processor, memory, and: a database of authorized computers, each authorized computer identified by a serial number; and wherein the computer is, configured to, receive a line of human-readable code having a non-functional tag of data having an indicia of a serial number identifying a first remote computer, said non-functional tag of data being associated with the line of human-readable code, convert the line of human-readable code into machine-language if the indicia of the serial number within the non-functional tag of data is within the database of authorized computers, and, communicate the line of human-readable code and non-functional tag of data to a second remote computer if the indicia of the serial number within the non-functional tag of data is not within the database of authorized computers.

* * * * *